United States Patent [19]

Tomczuk

[11] 4,164,069

[45] Aug. 14, 1979

[54] METHOD OF PREPARING A POSITIVE ELECTRODE FOR AN ELECTROCHEMICAL CELL

[75] Inventor: Zygmunt Tomczuk, Orland Park, Ill.

[73] Assignee: The United States of America as represented by the United States Department of Energy, Washington, D.C.

[21] Appl. No.: 901,046

[22] Filed: Apr. 28, 1978

[51] Int. Cl.$^2$ ............... H01M 6/14; H01M 4/58
[52] U.S. Cl. ................... 29/623.1; 252/182.1; 423/138; 423/179.5; 429/103; 429/199; 429/218; 429/220; 429/221
[58] Field of Search ............ 252/182.1; 29/623.1; 423/138, 179.5; 429/102, 103, 199, 218, 220, 221

[56] References Cited

U.S. PATENT DOCUMENTS

| | | | |
|---|---|---|---|
| 4,006,034 | 2/1977 | Shimotake et al. | 29/623.1 |
| 4,011,373 | 3/1977 | Kaun et al. | 429/218 |

OTHER PUBLICATIONS

Argonne National Laboratory, Progress Report for Jan.-Jun. 1974, pp. 78-80.

*Primary Examiner*—Benjamin R. Padgett
*Assistant Examiner*—Irwin Gluck
*Attorney, Agent, or Firm*—Dean E. Carlson; Frank H. Jackson; Hugh W. Glenn

[57] ABSTRACT

A method of preparing an electrochemical cell including a metal sulfide as the positive electrode reactant and lithium alloy as the negative electrochemical reactant with an alkali metal, molten salt electrolyte is disclosed which permits the assembly to be accomplished in air. The electrode reactants are introduced in the most part as a sulfide of lithium and the positive electrode metal in a single-phase compound. For instance, $Li_2FeS_2$ is a single-phase compound that is produced by the reaction of $Li_2S$ and $FeS$. This compound is an intermediate in the positive electrode cycle from $FeS_2$ to $Fe$ and $Li_2S$. Its use minimizes volumetric changes from the assembled to the charged and discharged conditions of the electrode and minimizes electrode material interaction with air and moisture during assembly.

7 Claims, No Drawings

METHOD OF PREPARING A POSITIVE ELECTRODE FOR AN ELECTROCHEMICAL CELL

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a method of preparing a positive electrode that includes the cell reactants in a less reactive form to permit cell assembly in air rather than under a helium or other inert gas environment. More particularly, it relates to the use of partially charged electrode reactants that are not likely to be oxidized or to absorb the moisture within an ordinary work space environment.

The type of electrochemical cells contemplated are those that include the metal chalcogenides as the positive electrode reactants, for instance, FeS, $FeS_2$, CoS, $CoS_2$, NiS, $NiS_2$, and $Cu_2S$ as well as the other chalcogenides of the transition metals and mixtures of these reactants. The negative electrodes include as reactants solid alloys of lithium and the other alkali metals and alkaline earth metals. Alloys such as lithium-aluminum, lithium-silicon, calcium-aluminum, calcium-magnesium and calcium-silcon have been considered for use. These cells employ molten salt electrolytes generally including the halides of the alkali metals and the alkaline earth metals. The use of salt mixtures, e.g. LiCl-KCl, permits reduced melting points and lower operating temperatures. Examples of these type cells are illustrated in the U.S. patents cited below in the prior art statement.

PRIOR ART STATEMENT

Kaun et al., "Uncharged Positive Electrode Composition", U.S. Pat. No. 4,011,373, Mar. 8, 1977. This patent describes an electrochemical cell with an initial positive electrode composition containing lithium sulfide and a transition metal powder. The cell is electrically charged to form transition metal sulfide in the positive and lithium alloy in the negative electrode. Other lithium compounds are included in the composition. The negative electrode includes a metalloid such as aluminum or silicon for alloying with lithium or a lithium alloy containing about 5 to 10 atom percent lithium. The patent does not disclose the use of a single-phase compound of lithium, a transition metal and sulfur in the positive electrode.

Shimotake et al., "Method of Preparing an Electrochemical Cell in Uncharged State", U.S. Pat. No. 4,006,034, Feb. 1, 1977. This patent discloses an electrochemical cell with lithium sulfide along with a transition metal in the positive electrode and a metalloid such as aluminum or silicon for alloying with lithium in the negative electrode.

ANL-8109, "High Performance Batteries for Off-Peak Energy Storage and Electric-Vehicle Propulsion", Progress Report January–June 1974, Argonne National Laboratory 1975. This report discloses $Li_2FeS_2$ as a phase occurring in $FeS_2$/Li cells but does not suggest its use in electrode preparation.

None of the prior art references teach the novel method of preparing a positive electrode as summarized below.

SUMMARY OF THE INVENTION

It is an object of the present invention to provide a method of preparing a positive electrode that includes the cell reactants in a form having reduced hygroscopic and reductive activity.

It is an object to provide a positive electrode that can be assembled in an electrochemical cell within an air environment.

It is a further object to provide a positive electrode material for use in an iron sulfide-lithium alloy high-temperature cell which will undergo minimal volume change from the initial preparation on cycling.

In accordance with the present invention, a method is provided for preparing a positive electrode for use in an electrochemical cell including a metal sulfide positive electrode, a lithium alloy negative electrode, and an electrolytic salt mixture including alkali metal halides. The method includes preparing a positive electrode reactant material by reacting $Li_2S$ with FeS to form $Li_2FeS_2$ (X phase). Mixtures, substitutions and solid solutions including other transition metals or other transition metal chalcogenides are also contemplated. The positive electrode structure is formed by consolidating this lithium-iron sulfide into a porous compact or other solid form and assembling it into an electrochemical cell including a lithium or lithium alloy negative electrode for electrochemical cycling.

In more specific aspects of the invention, approximately equal molar amounts of FeS and $Li_2S$ are melted together at about 1300 K and resolidified to form a single phase of $Li_2FeS_2$ for use in the positive electrode. In another aspect, $Cu_2S$ in an amount less than 10 mole percent based on total metal sulfide is blended with FeS and $Li_2S$ material prior to melting. This combination forms a single-phase material on resolidification. Other positive electrode compositions include uniform solid mixtures of $Li_2FeS_2$ and additional transition metal sulfides.

DETAILED DESCRIPTION OF THE PREFERRED EMBODIMENT

In one manner of preparing the positive electrode of the present development, a lithium and iron sulfide salt, $Li_2FeS_2$ (X phase), is provided. The lithium-iron sulfide salt has been shown to be particularly well suited as a single-phase compound that can be used for the positive electrode reactant material. This salt can be prepared by blending powders of $Li_2S$ and FeS in approximately equal molar amounts and heating to a temperature of about 1300 K where the materials are molten. On resolidification, the salt compound, $Li_2FeS_2$, is formed.

The X-phase compound is the major component within the positive-electrode, reactant material. It can be used alone or in some instances advantageously blended with other transition metal sulfides, e.g. $Cu_2S$, CoS, or NiS. The additional metal sulfide can be included during the X-phase preparation step or at a later time. When minor proportions of $Cu_2S$, i.e. less than 10 mole percent based on total metal sulfides, are included in the initial FeS-$Li_2S$ mixture prior to X-phase formation, a single-phase material is formed. One preferred combination of these materials includes five mole parts FeS, five mole parts $Li_2S$ and one mole part $Cu_2S$. In this phase, the cuprous sulfide is either soluble within the X phase or copper substitutes for lithium or iron in the X-phase structure. Other combinations, as with CoS and NiS, may produce more than one phase and a uniform particulate mixture is prepared for use as the positive-electrode, reactant material. The use of these various combinations can provide several advantages in particular applications such as reduced electrode expansion and improved conductivity within the cell.

The positive-electrode, reactant material is incorporated into a solid structure for use in an electrochemical cell. This can be accomplished by a number of methods. For example, the reactant material can be mixed with particulate electrolyte and embedded into a mesh or a cellular, honeycomb-like current collector structure. Also a compact of the electrode material including electrically conductive particles, conductors or mesh for current collection can be prepared, each with a suitable connection for the cell feedthrough conductor. In other methods, electrodes are prepared by distributing particles of the reactant material by vibration within a porous electrically conductive substrate of stainless steel, vitreous carbon or nickel. In other applications, carbon binder material such as a monomer of furfuryl alcohol and a suitable polymerization agent or one of the various resin materials can be polymerized or solidified with particles of the reactant material to form a porous electrode structure. Each of these techniques are well known processes that are clearly described in prior art patents and publications such as those cited above.

A positive electrode as thus prepared can be assembled with one or more negative electrodes within an electrochemical cell housing and electrochemically charged to provide metal sulfides of higher oxidation states, e.g. $FeS_2$, $NiS_2$, $CoS_2$, $CuFeS_2$ and mixtures of these materials in the positive electrode.

The X-phase material, like $Li_2S$, includes lithium in a combined form to reduce the risk of handling that reactive alkali metal. Moreover, $Li_2FeS_2$ is less hygroscopic than $Li_2S$ and can be exposed to air with less moisture absorption. However, the X-phase material is somewhat hygroscopic and is preferably handled in a dry environment, for example in a room maintained at less than 30% relative humidity at normal room temperatures of 20°-25° C.

Although $Li_2FeS_2$ is the preferred positive electrode reactant, other single phases have been found in the lithium-iron-sulfur system which may also be suitable for electrode preparation. Another such material has been identified as $Li_3Fe_2S_4$, referred to as the Z phase. The use of this material is one other manner of including lithium into the electrochemical cell in a less reactive form. Positive electrodes of Z phase or Z phase in mixture with $FeS_2$ can be prepared for assembly in a similar manner as that described above for the X-phase material.

The negative electrode for a cell of this type can include lithium as a metal or as an alloy to supplement that included in the positive electrode. The alloy form is easier to contain and is less reactive to facilitate assembly in an air atmosphere. Porous plaques or layers of lithium-metalloid alloys such as lithium-aluminum or lithium-silicon are suitable for use. If the cell is to be operated in an upper plateau between $FeS_2$ and $Li_2FeS_2$ in the positive electrode, then only a relatively small additional amount of lithium is required. This can be included as a low lithium alloy of, for example, less than 10 atom percent lithium in aluminum. Where the positive electrode is to be discharged to a lower plateau, for instance to Fe and $Li_2S$, additional lithium can be included as alloys of up to about 50 atom percent lithium.

The following examples are presented merely to illustrate the present invention.

EXAMPLE I

X-phase material ($Li_2FeS_2$) is prepared by mixing approximately equal molar amounts of FeS and $Li_2S$ in sufficient quantity to produce about 2.5 grams. The blended powders are melted together at a temperature of approximately 1300 K for about 30 minutes to convert substantially all of the reactants to a single-phase material on solidification. The X phase was assembled in a porous carbon cup which acts as a positive electrode current collector and positioned in a cell container as the positive electrode. A negative electrode having lithium metal adsorbed on a porous substrate of stainless steel, felt-metal was assembled opposite the positive electrode within LiCl-KCl molten electrolyte salt. The initial cell voltage was about 1.71 volts but was charged to a cutoff voltage of about 2.1 volts as a fully charged lithium-$FeS_2$ cell.

EXAMPLE II

A positive electrode including about 7 grams of single-phase material made up of 5 parts $Li_2S$, 5 parts FeS and 1 part $Cu_2S$, was assembled opposite a Li-Al electrode containing roughly 48 atom % lithium and additional amounts of aluminum powder. The cell was operated with molten LiCl-KCl electrolytic salt and exhibited an initial voltage of about 1.3-1.4 volts. Cycling proceeded between 1.9 and 0.9 cutoff voltages in the charging and discharging cycles, respectively. This cell has been continuously cycled for over a two-month period.

EXAMPLE III

A positive electrode including X-phase material blended with approximately 10 weight percent carbon powder for current collection is bound through the polymerization of furfuryl alcohol polymer into a porous, positive-electrode structure. This electrode is assembled in a molten LiCl-KCl salt cell opposite to a negative electrode containing a porous lithium-aluminum plaque in alloy form with about 7 atom % lithium. The components of the cell are assembled in air with the molten electrolyte introduced following electrode assembly and evacuation of the cell housing. The cell is fully charged to form $FeS_2$ in the positive electrode and higher lithium concentrations within the lithium alloy of the negative electrode.

It will be clear that the foregoing examples merely illustrate methods of preparing positive electrodes in accordance with the present invention. Various modifications of the size, composition and structure of these electrodes and cells can be made within the scope of the invention as is defined in the claims.

The embodiments of the invention in which an exclusive property or privilege is claimed are defined as follows:

1. A method of preparing a positive electrode for use in a secondary electrochemical cell also including a negative electrode having lithium or lithium-metalloid alloy as the neagative electrode reactant and a molten salt including a lithium halide as electrolyte, said method comprising
combining FeS with $Li_2S$ to form the compound $Li_2FeS_2$;
incorporating said compound into an integral structure for use as a positive electrode; and assembling said positive electrode into said electrochemical cell.

2. The method of claim 1 wherein said $Li_2FeS_2$ is formed by melting approximately equal molar amounts of FeS with $Li_2S$ together at about 1300 K and resolidifying to form single-phase, solid $Li_2FeS_2$.

3. The method of claim 1 wherein FeS and $Li_2S$ are combined in about equal molar portions and $Cu_2S$ is added to the combination in an amount less than 10 mole percent based on total metal sulfides to form a single-phased, positive electrode material.

4. The method of claim 3 wherein FeS, $Li_2S$ and $Cu_2S$ are reacted together in the molar proportion of 5, 5 to 1 respectively to form the positive electrode material.

5. The method of claim 1 wherein $Li_2FeS_2$ in particulate form is blended with solid particulate LiCl-KCl salt and pressed to form a positive electrode compact.

6. The method of claim 1 wherein a uniform mixture of $Li_2FeS_2$ and a second transition metal sulfide selected from the sulfides of cobalt and nickel is formed for use in said positive electrode.

7. The method of claim 1 wherein said cell is assembled in air with less than 30% relative humidity.

* * * * *